Patented Feb. 3, 1948

2,435,245

UNITED STATES PATENT OFFICE 2,435,245

STABILIZED POLYMERS OF ETHYLENE

Daniel E. Strain, Wilmington, Del., assignor to E. I. du Pont de Nemours & Company, Wilmington, Del., a corporation of Delaware No Drawing. Application February 5, 1944, Serial No. 521,263

3 Claims. (Cl. 260—94)

This invention relates to new compositions of matter and particularly to new compositions of matter comprising polymers of ethylene.

The polymers of ethylene are made by, for example, the processes of U. S. Patents 2,153,553, or 2,188,465, or by contacting ethylene with water and a peroxy compound catalyst, preferably a diacyl peroxide or a dialkyl dioxide, at temperatures of from 40 to 350° C. and at pressures in excess of atmospheric, preferably in the range of 50 to 3000 atmospheres. The polymers of ethylene correspond in composition substantially to $(CH_2)_x$, in which $x$ is 50 to 100 or more, vary in properties from liquids to solids and soften or melt between about 100° C. and about 120° C., their melting point being substantially independent of their molecular weight.

It is an object of this invention to provide compositions comprising ethylene polymers which have improved physical and electrical stability. Another object is to provide compositions comprising ethylene polymers which in the form of self-supporting films, molded articles, fibers, or coatings, are stabilized against degradation. Still another object is to provide new compositions comprising as a major component, ethylene polymers, and as a minor component, a diphenylamine-acetone condensation product. Other objects will appear hereinafter.

The above objects are accomplished according to this invention by incorporating into a normally solid ethylene polymer a small amount of a liquid acetone diphenylamine condensation product or their solid product which is a mixture of the diacetone phenylamine condensation product with diphenyl p phenylene diamine. These compounds may be mixed with the polymer in any suitable manner that will effect thorough distribution. This can be accomplished in a machine suitable for mixing solids or incorporating liquids, as by milling the ethylene polymer with the addition agent on heated rolls, such as are used in the compounding of rubber, or on other suitable milling or mixing equipment, such for example, as the Banbury mixer. Instead of adding the agent to the polymer in the solid or molten state, it can be added to a solution or suspension of polymer in an organic solvent or to an aqueous dispersion thereof and the volatile solvent subsequently removed by vaporization.

In general, the amount of agent to be added to the ethylene polymer depends upon the degree and kind of stabilization desired. The amount of agent added can vary up to 5.0% based on the weight of the ethylene polymer, but as a rule it is preferred to use the minimum amount required to achieve the desired results. The amount commonly used will vary from 0.005 to 2.0 parts by weight per hundred parts ethylene polymer.

In one form of practicing the invention, the ethylene polymer, such, for example, as a solid polymer having a molecular weight of about 4,000, is dissolved in a hot organic hydrocarbon solvent, e. g., xylene, and to this solution is added the agent in amount sufficient to give 1% thereof, based on the weight of the polymer. These solutions are cast on steel plates; the thickness of the film is adjusted so as to give a dry film of about 1 mil in thickness; the solvent is removed by evaporation, and, after drying, the film is stripped from the plate.

The examples which follow illustrate the utility and the outstanding advantages of this invention:

*Example.*—A solid polymer of ethylene obtained by polymerization at a temperature of about 200° C., a pressure of about 1000 atmospheres and in the presence of a peroxide catalyst and having a molecular weight of at least 4 000 was worked on the rolls of a steam heated rubber mill until a continuous sheet was formed. This required about 0.5 minute at roll temperatures of 170° C. Sufficient powdered acetone-diphenylamine condensation product was then sprinkled on the mill bank to give 0.05% thereof based on the polymer. After the milling had continued for one hour at 170° C., the sheet was removed from the mill, compression molded into a suitable shape, and the power factor of the compound determined. A duplicate sample of polymer was treated in the same manner except that no acetone-diphenylamine condensation product was added.

At 3000 megacycles the power factor of the polymer containing no stabilizer was $58.0 \times 10^{-4}$ of the stabilized polymer $5.8 \times 10^{-4}$.

The table illustrates a series of products which have been stabilized by the incorporation of the indicated amounts of stabilizing agents.

Power factor stability of ethylene polymer blends

| Ethylene Polymer | Melt Viscosity [1] | Milling Conditions | | Concentration Per Cent Stabilizer [2] | Power Factor ×10⁻⁴ | |
|---|---|---|---|---|---|---|
| | | Time, Min. | Temp., °C | | 3000 Mc. | 10⁶ Mc. |
| A | 1.5 | 60 | 170 | 0.00 | 58.0 | |
|   |     | 60 | 170 | 0.05 | 5.8 | 4.8 |
|   |     | 60 | 170 | 0.10 | 5.7 | 6.5 |
|   |     | 60 | 170 | 0.20 | 5.5 | 5.8 |
| B | 0.025 | 60 | 170 | 0.00 | | 19.8 |
|   |     | 60 | 170 | 0.10 | | 3.1 |
| C | 0.5 | 60 | 150 | 0.00 | 17.1 | |
|   |     | 60 | 150 | 0.05 | 6.8 | 5.1 |
|   |     | 60 | 150 | 0.10 | 6.9 | 6.3 |
|   |     | 60 | 150 | 0.20 | 5.8 | 4.8 |
| D | 0.003 | 60 | 150 | 0.00 | 20.9 | |
|   |     | 60 | 150 | 0.10 | 5.9 | 6.0 |
|   |     | 60 | 150 | 0.20 | 5.8 | 6.0 |
| E [3] | 0.004 | 60 | 170 | 0.00 | | 20.8 |
|   |     | 60 | 170 | 0.10 | | 3.6 |

[1] The melt viscosity is the measure of the weight rate of extrusion of molten polymer at 190° C. under a constant load, the measurement being made in an instrument having the following specifications: an aluminum cylinder of ⅜" internal diameter open at the top and fitted at the bottom by an 8 mm. steel disk containing at its center a 2.1 mm. orifice. The cylinder and disk are heated to a temperature of 190° C. and the product to be tested introduced. Above the surface of the product a piston heated to 190° C. and 1¹⁄₃₂" in diameter is superimposed and upon it a weight is placed giving a combined weight of 2.16 kilo. The weight of product flowing from the orifice in grams per ten minutes is the measure of the melt viscosity.

[2] Acetone diphenyl amine condensation product.

[3] 60% ethylene polymer—40% Vistanex (polyisobutylene).

Because of their excellent stability, the ethylene polymers containing the agents of this invention are advantageously used as binders, coatings, and impregnating agents in the manufacture of electrical insulating materials. In sheet form, the compositions of this invention can be used as condenser plate separators, as separators in storage batteries, and as separators for the layers of coils in transformers, and also as external insulation on all sorts of coils such as are used in electrical machinery, radio, television, telephone, telegraph, and miscellaneous electrical and electronic apparatus.

In the form of sheets, the compositions of this invention are valuable as so-called slot insulation in dynamoelectrical machines such as motors and generators. In dynamos the connecting coils are positioned in slots which are formed in the magnetic core and which are lined with suitable insulations; the slot lining or both, may be fabricated from the compositions of this invention. The connections between the coils and the so-called end-windings are preferably insulated with the compositions of this invention. The connections between the coils may be covered by a sleeve, which is preferably composed of the compositions of this invention in order that the sleeve may have the desired flexibility, insulating properties, and permanence. Sheets may be punched into segments of the proper shape as spacers between commutator bars of automotive, airplane and electric starter motors and generators for alternating frequency and direct currents. Motors so fabricated are particularly useful in devices and locations where the machines are exposed to conditions abnormally destructive to conventional insulation. The compositions of this invention can also be extruded about wire or other electrical conductors, or they can be formed into tapes or ribbons and applied about the wire or other electrical conductor.

In the above described electrical uses, the compositions of this invention can be employed as such or they can be modified with such materials as pigments, fillers, paraffin wax, or polymeric materials such as rubber, hydrogenated rubber, polyisobutylene, polystyrene, polybutadiene, etc.

The remarkable stability against heat of the compositions of this invention renders them more suitable than unstabilized ethylene polymers for melt extrusion of films, fibers, filaments, and coatings, or for other melt manipulations. The physical properties of objects prepared from ethylene polymers by melt manipulation are influenced by the temperature used. Temperatures above 145° C. are preferred, providing that excessive degradation of the polymer can be avoided. Unstabilized compositions suffer serious degradation if held for appreciable periods at such temperatures, even when practical precautions to exclude oxygen from the polymers have been taken. However, the stabilized compositions of this invention are resistant to degradation under these conditions. Such films are useful as unsupported films or in coatings or laminations, while the fibers or filaments can be knitted or woven into valuable fabrics, tubings, etc.

I claim:

1. A composition of matter consisting of a normally solid homopolymer of ethylene and from 0.001% to 5.0% by weight of diphenylamine-acetone condensation product, based on the weight of the homopolymer.

2. A composition of matter consisting of a normally solid homopolymer of ethylene and from 0.05% to 2.0% by weight of diphenylamine-acetone condensation product, based on the weight of the homopolymer.

3. A composition of matter consisting of a normally solid homopolymer of ethylene and 0.05% by weight of diphenylamine-acetone condensation product, based on the weight of the homopolymer.

DANIEL E. STRAIN.

REFERENCES CITED

The following references are of record in the file of this patent:

UNITED STATES PATENTS

| Number | Name | Date |
|---|---|---|
| 2,099,236 | Sibley | Nov. 16, 1937 |
| 1,975,179 | Smith | Oct. 2, 1934 |
| 2,268,418 | Paul | Dec. 30, 1944 |
| 2,336,195 | Sparks | Dec. 7, 1943 |

OTHER REFERENCES

Swallow, Endeavour, vol. 3, pages 26–31 (Jan. 1944).